United States Patent Office

3,558,325
Patented Jan. 26, 1971

3,558,325
ALCOHOLIC BEVERAGES
Andrew A. Recsei, 633 Tabor Lane,
Santa Barbara, Calif. 93103
No Drawing. Filed May 2, 1968, Ser. No. 726,227
Int. Cl. C12g 3/06
U.S. Cl. 99—30
13 Claims

ABSTRACT OF THE DISCLOSURE

Salts of glycine and alanine are useful for improving the smoothness, mellowness and flavor of alcoholic beverages. The use of these salts improves the palatability of all alcoholic beverages regardless of original quality.

---

This invention relates to novel salts of glycine and alanine and their use in improving the smoothness, mellowness and flavor of alcoholic beverages. In particular, it relates to the citrate, tartrate and cyclamate salts of glycine and alanine.

The composition aspect of this invention resides in the novel palatably acceptable salts of glycine and alanine.

The process of use aspect of this invention resides in the concept of adding these salts or forming these salts in situ in alcoholic beverages to improve the flavor, mellowness, palatability and smoothness of these beverages.

It is well-known that wines and whiskies have to be aged for several years to acquire a smooth and mellow taste. This is an expensive process which make a quality product costly. Large amounts of space are necessary to maintain large inventories of product with no immediate compensation possible. A process has long been needed which would substitute for long ageing time in alcoholic beverage processing without sacrificing mellowness or taste. This would allow for the production of palatable drinks at lower cost.

The method of this invention is applicable to all alcoholic beverages regardless of original quality. The process does not make all alcoholic beverages of equal palatability but improves the mellowness, smoothness and palatability of each quality level proportionally. An alcoholic beverage which was unacceptable before treatment by the process would after treatment be palatable and have improved mellowness and sweetness. A high quality product after treatment will be raised to a flavor peak. Each treated beverage will be noticeably improved over the untreated beverage of the same class as to mellowness, smoothness and taste.

It has been found that the inclusion of 0.01 percent to 6.0 percent (w./v.) of the salts of this invention in an alcoholic beverage will improve the smoothness, mellowness and taste of these beverages having an alcoholic content between 3.0 percent and 50.0 percent. The salt can be formed either in situ or added to the alcoholic beverage in the form of a concentrated solution or solid.

Taste is a matter of personal preference. Another embodiment of the invention contemplates the use of excess glycine, alanine, or the salt to balance the flavor of the wine or liquor to meet an individual's preference.

The compound aspect of this invention comprises the non-toxic, palatably acceptable acid addition salts of glycine and alanine. These salts form immediately on contacting glycine or alanine and the particular acid in a suitable solvent. Suitable, non-toxic, palatably acceptable acids useful to form the salts of the invention are organic acids such as ascorbic acid, malic acid, gluconic acid, citric acid, tartaric acid, cyclamic acid, and the like, which form with alanine and/or glycine salts having a palatably acceptable flavor which can be imparted to the beverage. In the preferred embodiment of this invention, the salts are those formed with tartaric, citric and cyclamic acids.

Alanine is found in the alpha and beta form. The alpha alanines have a pleasant sweet taste while the beta alanines are tasteless. For the purposes of this invention only alpha alanine is operable.

The following examples are illustrative of the compounds of this invention and of the processes by which they can be prepared and used but are not to be construed as limiting. Proportions of salt to beverage are given in terms of percent weight/volume (w./v.).

SALTS

Example I—Glycine-citrate 1.9 grams citric acid is dissolved in 3 cc. hot water and 0.75 gram of glycine are gradually added. The mixture is heated in a water bath and stirred until all the reactants are dissolved. A small amount of activated carbon is added and the solution is filtered under suction. The filtrate is cleared. Add to the clear filtrate 3 cc. methanol and isopropanol in small quantities until a turbidity occurs. The salt is crystallized by cooling. The salt is recrystallized in water. Glycine-citrate melts at 168–169° C. The molecular weight is 267. The elemental analysis shows 34.26 percent carbon and 5.5 percent hydrogen. The theoretical values are: 35.97 percent C and 4.91 percent H.

Glycine-citrate is extremely soluble and therefor it is difficult to prepare it in a state which is analytically pure. The infrared spectrum of glycine-citrate shows several peaks not seen in glycine or citric acid, and less absorption in the amino acid region, between 2100 and 2900 cm.$^{-1}$.

The empirical formula is: $C_8H_{13}NO_9$. The structural formula is:

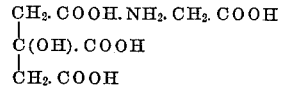

Example II—Glycine-cyclamate 1.5 grams glycine is added in small amounts to 3.6 grams cyclamic acid (cyclohexylsulfamic acid) in 5 cc. distilled water. The solution is heated on a steam bath with stirring to dissolve the compounds. A small amount of carbon is added and the solution is stirred and filtered while hot. The clear solution is kept in the refrigerator overnight. A crystal slurry is formed which is filtered and washed with a very small amount of 50.0 percent ice cold methanol. The product is dried at 50° C.

Glycine-cyclamate melts between 140°–150° C. with charring. The molecular weight is 254.31 and the empirical formula is: $C_8H_{18}N_2O_5S$. The elemental analysis shows 37.54 percent carbon and 6.88 percent hydrogen, while the theoretical values are: 37.80 percent C. and 7.12 percent H. The infrared spectrum of glycine-cyclamate shows that it is a new compound. Glycine-cyclamate has peaks between 900–1700 cm.$^{-1}$ which are not seen in glycine and citric acid alone. The characteristic peaks of glycine which occur between 2100–2800 cm.$^{-1}$ are absent in glycine-cyclamate. The structural formula is:

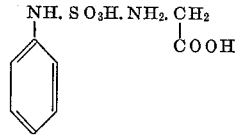

Example III—Alanine-cyclamate 3.6 grams cyclamic acid and 1.80 grams alanine are combined in 3 cc. hot water. The product is worked up in the same manner as described in Example II.

Alanine-cyclamate is very soluble in water and does not have a sharp melting point. It melts between approximately 145°–160° C. The molecular weight is 268. The elemental analysis gives 41.05 percent carbon and 7.88 percent hydrogen, while the theoretical values are 40.29 percent C and 7.50 percent H. The infrared spectrum confirms the new compound, with new peaks at 2910, 1710, 1580, 1495, 1370 cm.$^{-1}$. The empirical formula is: $C_9H_{20}N_2O_5S$. The structural formula may be represented thusly:

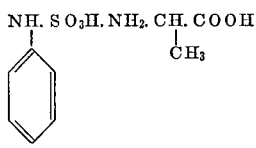

Example IV—Glycine-tartrate

This compound cannot be readily isolated from solution in a crystalline form and therefore it was prepared by the following method. 0.75 gram tartaric acid and 0.37 gram glycine were thoroughly mixed in a mortar and the fine powder heated slowly in an oil bath until the mixture melted. The container was placed in a desiccator and allowed to solidify. The molecular weight is 225. The empirical formula $C_6H_{11}NO_8$. The structural formula:

COOH.NH$_2$.CH$_2$.COOH
|
HC(OH)
|
HOCH
|
COOH

The infrared spectrum of glycine tartrate indicates that it is a new compound. It has characteristic peaks between 1400–1700 cm.$^{-1}$ which do not appear in the spectra of the components.

Example V—Alanine-citrate 0.45 gram alanine and 0.97 gram nitric acid are treated as described in Example IV. The infrared spectrum confirms that it is a new compound. The characteristic peaks of alanine between 2000 and 3100 cm.$^{-1}$ are absent in the spectrum of alanine citrate. There are characteristic peaks in alanine citrate between 1430 and 1680 cm.$^{-1}$. The molecular weight is 281 and the empirical formula $C_9H_{15}NO_9$.

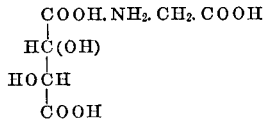

Example VI—Alanine tartrate 0.45 gram alanine and 0.97 gram citric acid are bined as in Example IV. The characteristic peaks of alanine are missing in the infrared spectrum of alanine-citrate which shows characteristic peaks between 1350–1600 cm.$^{-1}$. The molecular weight is 239 and the empirical formula $C_7H_{13}NO_8$. The structural formula:

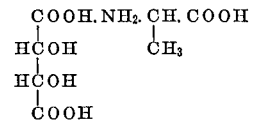

USE

As has been pointed out above, the salts useful in this invention can be formed either in situ or added in the form of a ready-prepared salt. The particular concentration of the salt in the beverage will vary somewhat, depending upon the particular beverage and on the subjective criteria of the tasting individual. As a general rule the addition of between 0.01 percent to 6.0 percent w./v. of the salts will improve any alcoholic beverage having between 3.0 to 50.0 percent alcoholic content. In the preferred embodiment the citrates and tartrates of glycine and alanine are used in 0.1 percent to 1.5 percent concentration and the cyclamates of alanine and glycine is used in 0.01 percent to 0.5 percent concentration.

The improvement of particular beverages is illustrated as follows when the salt is formed in situ. A preferred range for treating light-colored table wines is 0.25 percent to 1.0 percent of glycine or alanine, and 0.03 percent to 0.5 percent of citric or tartaric acid. The average light colored wine will be improved by treatment with 1.0 percent of the amino acid and 0.1 percent citric acid or tartaric acid. (Equivalent to 1.1 percent of the salt added separately.) For red table wines, such as burgundy, claret, cabarnet and others, the preferred range would be 1.0 percent to 1.5 percent of the glycine or alanine, and from 0.1 percent to 0.5 percent of the citric or tartaric acid.

Glycine cyclamate and alanine cyclamate have a milder and pleasanter taste than cyclamic acid itself, but these compounds are quite sweet and only very small quantities are necessary or desirable for improvement of the alcoholic beverages. As a rule, as little as 0.01 percent to 0.5 percent of the salt is sufficient to improve the flavor of wine. The preferred amount is 0.025 percent to 0.05 percent. Larger quantities of the salts would make the wine too sweet and, although this is desirable in dessert wines, it is not desirable in table wines which should be maintained slightly dry.

Distilled spirits such as whisky, vodka, brandy, rum and scotch will all be improved without exception. The salts are added within the following ranges to improve these beverages: 0.25 percent to 0.5 percent glycine or alanine and 0.025 percent to 0.08 percent citric or tartaric acid will produce improvements which are appreciated by the average consumer and the expert taster as well. An addition of 0.01 percent to 0.025 percent of glycine-cyclamate or alanine-cyclamate will further noticeably improve these beverages.

Beer can also be improved by this process. The addition of 0.025 percent glycine-cyclamate or alanine-cyclamate will produce an instantaneous and definite improvement.

Sparkling wines such as champagne are also improved by this process. It will enhance the fruity flavor and impart a mellow freshness as well as reduce excessive yeastiness and accentuate the natural bouquet. The average amounts for the improvement of champagne are 0.5 percent to 2.0 percent glycine, 0.05 percent to 0.25 percent citric acid and 0.05 percent to 0.1 percent glycine-cyclamate. These amounts vary according to the desired effect, that is dry, extra dry or semi-sweet.

The salts of this invention can be used either separately or in combination, depending upon personal taste. Because the taste of alcoholic beverages is somewhat of a subjective quality, it is necessary to select the optimum concentration of salt in a particular batch of wine on a commercial scale by the use of a panel of tasters. The following would be illustrative of the application of this invention to a commercial scale and range and selection of optimum conditions.

Example VII—Wine treatment: Commercial scale

One thousand gallons sauterne, or another light wine, which is to be processed is treated as follows: ten 100 cc. samples of the wine are taken and the salt formed in situ as follows:

| Sample | 1 | 2 | 3 | 4 | 5 | 6 | 7 | 8 | 9 | 10 |
|---|---|---|---|---|---|---|---|---|---|---|
| Citric acid (gram) | 0.025 | 0.03 | 0.03 | 0.04 | 0.05 | 0.06 | 0.07 | 0.08 | 0.10 | 0.15 |
| Glycine (gram) | 0.25 | 0.25 | 0.3 | 0.3 | 0.5 | 0.6 | 0.7 | 0.8 | 1.0 | 1.0 |

Tartaric or cylamic acid may be substituted for citric acid and alanine may be used in place of glycine. A panel, skilled in the art of tasting, independently recorded its observations. By comparing two samples at a time and eliminating the less desirable beverage, the one with the best taste is selected. If, for example, it has been found that 0.75 percent glycine and 0.075 percent citric acid give the best results, then 63 pounds of glycine and 6½ pounds citric acid are dissolved in 20 gallons of wine. This is added to the rest of the sauterne and thoroughly mixed.

Example VIII—Distilled spirits treatment: Commercial scale

One thousand gallons of whisky, or other distilled spirits, can be treated in the manner similar to Example I. Take ten 100 cc. samples and form the salts in situ as follows:

| Sample | 1 | 2 | 3 | 4 | 5 | 6 | 7 | 8 | 9 | 10 |
|---|---|---|---|---|---|---|---|---|---|---|
| Citric acid (gram) | 0.05 | 0.06 | 0.06 | 0.07 | 0.075 | 0.075 | 0.08 | 0.09 | 0.09 | 0.1 |
| Glycine (gram) | 0.25 | 0.25 | 0.3 | 0.3 | 0.35 | 0.4 | 0.4 | 0.4 | 0.5 | 0.5 |

After the optimum amount has been established, dissolve the citric acid in the whisky and add the glycine. With occasional stirring the salts dissolve completely and leave a clear solution.

The improving agent may be prepared directly for individual use by the ultimate consumer in the following manner:

Example IX—Preparation in liquid form for individual use

Dissolve in 80 liter hot distilled water 4 kg. citric acid and 22 kg. glycine. In one liter of warm glycerine dissolve 35 grams methyl-p-hydroxy benzoate and 15 grams propyl-p-hydroxybenzoate as preservatives. Add to the above solution, mix thoroughly, and adjust the volume with distilled water to 100 liter. The warm solution is filtered and packaged in 1 oz. and 2 oz. containers. Half an ounce of this solution is used for the improvement of one fifth of wine or whisky.

Example X—Preparation in powdered form for individual use

Mix thoroughly 32 kg. glycine, 6 kg. citric acid and 2 kg. alanine. Package 4 grams of this powdered mixture in plastic envelopes. One envelope is for the treatment of one fifth of wine or whisky. After a few minutes of shaking the powder dissolves in the wine and in the whisky after one-half hour.

The powdered form has the advantage of lower cost, while the liquid (as in Example IX) is more convenient to use.

RESULT OF TASTE PANEL SURVEY

The improvement of alcoholic beverages by the compounds and process of this invention is noticeable not only to the trained expert taster in the art but also to the average consumer. Taste comparisons tests were conducted on various beverages, using the processes and compounds of this invention as follows:

There were two panels of judges: one testing wines and the other distilled liquors. Two members of each panel were experienced tasters while the others were average consumers. The samples were coded in identical bottles. The judges compared two samples at a time and made a note as to the one they considered better. By gradual elimination they arrived at the one they decided to be the best. Between tests the judges munched on crackers and cheese to restore the sharpness of their taste buds.

The salts used in these tests were prepared in situ and the test results were as follows:

Example A

The panel, consisting of 6 members, tested 4 samples of medium quality California sauterne table wine with 12% alcohol, of the following composition:

(1) Original.
(2) 1% glycine and 0.1% citric acid.
(3) 1.5% glycine and 0.175% citric acid.
(4) 2% glycine and 0.2% citric acid.

These and all following quantities are w./v. Five members of the panel chose No. 3 and one No. 4 as the best.

Example B

Vin Rosé with 12% alcohol.

(1) Original.
(2) 1.2% glycine and 0.4% citric acid.
(3) 1.5% glycine and 0.5% citric acid.

Five judges chose No. 3 as the best and one chose No. 1.

Example C

Pale dry sherry containing 20% alcohol.

(1) Original.
(2) 1.5% glycine and 0.5% citric acid.
(3) 3% glycine and 0.75% citric acid.

Five members chose No. 3 and one member chose No. 2.

Example D

California burgundy with 12% alcohol.

(1) Original.
(2) 1.2% glycine and 0.12% citric acid.
(3) 1.2% glycine and 0.3% citric acid.
(4) 1.2% glycine and 0.5% citric acid.

Three members chose No. 2, two members chose No. 4 and one was undecided.

Example E

Imported Rhine wine designated: "10–13% alcohol."

(1) Original.
(2) 1.5% glycine and 0.2% citric acid.

All six judges chose No. 2 as their preference.

Example F

Imported, first-grade scotch, 86 proof.

(1) Original.
(2) 0.4% glycine and 0.08% citric acid.
(3) 0.6% glycine and 0.1% citric acid.
(4) 0.25% glycine and 0.05% citric acid.

There were seven members on the panel of which four chose No. 4, two No. 3, and one No. 2 as the best.

Example G

Average Kentucky whisky, 80 proof.

(1) 0.4% glycine and 0.08% citric acid.
(2) Original.
(3) 0.06% glycine and 0.12% citric acid.

Five members selected No. 3, one No. 1, and one judge was undecided.

Example H

Vodka, 86 proof.

(1) Original.
(2) 0.4% glycine and 0.06% citric acid.

(3) 0.45 glycine and 0.08% citric acid.
(4) 0.5% glycine and 0.1% citric acid.

Three members decided on No. 3, three members on No. 4 and one was undecided.

Example I

California Sauterne, table wine with 12% alcohol.
(1) Original.
(2) 1.5% glycine and 0.15% tartaric acid.
Five judges chose No. 2 and one No. 1.

Example J

Same California Sauterne.
(1) 1.7% alanine and 0.15% tartaric acid.
(2) Original.
All six judges preferred No. 1.

Example K

Same California Sauterne.
(1) 1.7% alanine and 0.15% citric acid.
(2) 0.025% cyclamic acid, 0.5% alanine and 1% citric acid.
Four judges chose No. 2 and two chose No. 1.

Example L

Chablis, white table wine with 12% alcohol.
(1) 1.0% alanine and 0.1% citric acid.
(2) Original.
All six members chose No. 1.

Example M

California sherry, light pale with 20% alcohol.
(1) 0.5% glycine, 0.025% cyclamic acid and 0.5% citric acid.
(2) 3% glycine and 0.75% citric acid.
(3) Original.
Five judges preferred No. 1 and one No. 2.

Example N

California Rosé, table wine with 12% alcohol.
(1) 1.5% glycine and 0.5% citric acid.
(2) 0.5% glycine, 0.025% cyclamic acid and 1.5% citric acid.
Five judges like No. 2 best and one No. 1.

Example O

Imported first grade Canadian whisky, 86.6 proof.
(1) 0.25% glycine and 0.05% citric acid.
(2) Original.
All judges preferred No. 1.

The results of the Taste Panel Survey clearly establish the benefit derived from the method of the invention.

In all cases the judges preferred the treated beverage over the untreated beverage. The taste improvement was equally discernible to the average consumers as to the experienced tasters.

The method as demonstrated to the testing panel works equally well on any type of alcoholic beverage having an alcoholic content between 3.0 percent and 50.0 percent.

What is claimed is:

1. A method of improving the taste, smoothness, mellowness and flavor of alcoholic beverages containing 3.0 percent to 50.0 percent alcohol by incorporating in said beverage between 0.01 percent to 6.0 percent of a non-toxic palatably acceptable salt formed by reacting alpha-alanine or glycine with acids selected from the group consisting of ascorbic, malic, gluconic, citric, tartaric and cyclamic.

2. The method of claim 1 wherein the salt is formed in situ.

3. The method of claim 1 wherein the salt is added to the beverage in the form of a concentrated solution.

4. The method of claim 1 wherein the salt is added to the beverage as a solid.

5. The method of claim 2 wherein 0.1 percent to 2.0 percent of glycine and 0.01 percent to 0.25 percent of citric or tartaric acid is included in the beverage.

6. A method according to claim 2 wherein 0.1 percent to 2.0 percent alpha-alanine and 0.01 percent to 0.25 percent of citric or tartaric acid is included in said beverage.

7. A method according to claim 1 wherein 0.1 percent to 1.5 percent of glycine citrate is included in said beverage.

8. A method according to claim 1 wherein 0.1 percent to 1.5 percent glycine tartrate is included in said beverage.

9. A method according to claim 1 wherein 0.1 percent to 1.5 percent alpha-alanine citrate is included in said beverage.

10. A method according to claim 1 wherein 0.1 percent to 1.5 percent alpha-alanine tartrate is included in said beverage.

11. A method according to claim 1 wherein 0.01 percent to 0.5 percent glycine cyclamate is included in said beverage.

12. A method according to claim 1 wherein 0.01 percent to 0.5 percent alpha-alanine cyclamate is included in said beverage.

13. An alcoholic beverage having 3.0 percent to 50.0 percent alcoholic content containing between 0.01 percent to 6.0 percent of a salt selected from the group consisting of glycine citrate, glycine cyclamate, glycine tartrate, alpha-alanine citrate, alpha-alanine cyclamate and alpha-alanine tartrate and mixtures thereof.

References Cited

UNITED STATES PATENTS

| | | | |
|---|---|---|---|
| 2,789,997 | 4/1957 | Shyun | 260—468 |
| 3,032,417 | 5/1962 | Lynch | 99—36 |
| 3,316,100 | 4/1967 | Scharf | 99—140 |
| 3,345,403 | 10/1967 | Galat | 99—141X |

FOREIGN PATENTS

| | | | |
|---|---|---|---|
| 839,711 | 6/1960 | Great Britain | 99—48 |

LIONEL M. SHAPIRO, Primary Examiner

D. M. NAFF, Assistant Examiner

U.S. Cl. X.R.

99—48